(12) United States Patent
Oohashi (10) Patent No.: US 12,449,786 B2
(45) Date of Patent: Oct. 21, 2025

(54) PROGRAM ANALYZER AND CONTROL SYSTEM

(71) Applicant: FANUC CORPORATION, Yamanashi (JP)

(72) Inventor: Ryouhei Oohashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 295 days.

(21) Appl. No.: 17/910,350

(22) PCT Filed: Mar. 16, 2021

(86) PCT No.: PCT/JP2021/010639
§ 371 (c)(1),
(2) Date: Sep. 9, 2022

(87) PCT Pub. No.: WO2021/187487
PCT Pub. Date: Sep. 23, 2021

(65) Prior Publication Data
US 2023/0185272 A1    Jun. 15, 2023

(30) Foreign Application Priority Data
Mar. 18, 2020  (JP) ................................ 2020-047476

(51) Int. Cl.
*G05B 19/4093* (2006.01)
*G05B 19/4063* (2006.01)

(52) U.S. Cl.
CPC ... *G05B 19/40938* (2013.01); *G05B 19/4063* (2013.01)

(58) Field of Classification Search
None
See application file for complete search history.

(56) References Cited

U.S. PATENT DOCUMENTS

2008/0021591 A1   1/2008   Tani et al.
2015/0293524 A1  10/2015   Sato et al.
(Continued)

FOREIGN PATENT DOCUMENTS

JP    H11327624 A   11/1999
JP    2006163665 A   6/2006
(Continued)

OTHER PUBLICATIONS

Boskovic, Aleksandar Z. "Development of simulation and off-line programming software modules for 5-axis waterjet cutting gantry robot." (2001). (Year: 2001).*

(Continued)

*Primary Examiner* — Carlos R Ortiz Rodriguez
(74) *Attorney, Agent, or Firm* — HAUPTMAN HAM, LLP (57) ABSTRACT

To provide a technique that enables easy detection of consistency of analyzable machining-related commands in a machining program. An program analyzer according to the present disclosure includes a program analysis unit that analyzes a machining program and extracts a command for selecting a tool; a tool information acquisition unit that acquires tool-related information corresponding to the selected tool; and a machining command check unit that determines if commands in the machining program to be executed with the tool being selected are consistent based on the tool-related information acquired by the tool information acquisition unit.

8 Claims, 9 Drawing Sheets

(56) References Cited

U.S. PATENT DOCUMENTS

| | | |
|---|---|---|
| 2016/0299491 A1 | 10/2016 | Kobayashi |
| 2016/0327938 A1 | 11/2016 | Kawai et al. |
| 2017/0038761 A1 | 2/2017 | Ando et al. |
| 2017/0168698 A1 | 6/2017 | Sakamoto et al. |
| 2017/0343989 A1 | 11/2017 | Itakura |
| 2019/0384262 A1 | 12/2019 | Saitou |

FOREIGN PATENT DOCUMENTS

| | | |
|---|---|---|
| JP | 200827045 A | 2/2008 |
| JP | 2016201031 A | 12/2016 |
| JP | 201733346 A | 2/2017 |
| JP | 2017111516 A | 6/2017 |
| JP | 2017211872 A | 11/2017 |
| JP | 2019219878 A | 12/2019 |
| WO | 2014068667 A1 | 5/2014 |
| WO | 2015097887 A1 | 7/2015 |

OTHER PUBLICATIONS

International Search Report in PCT/JP2021/010639, mailed May 18, 2021, 3pp.

Yang Weiquan, "CAXA-CAM and NC Machining Applications: Case Studies", Higher Education Press, Aug. 2024, pp. 213-221, 19pp.

\* cited by examiner

| TOOL NUMBER | TOOL |
|---|---|
| 01 | CENTER DRILL |
| 02 | DRILL (SMALL) |
| 03 | DRILL (MEDIUM) |
| 04 | DRILL (LARGE) |
| 05 | ENDMILL (12 mm DIAMETER) |
| 06 | ENDMILL (20 mm DIAMETER) |
| 07 | ENDMILL (SUITABLE) |
| 08 | POINT MASTER |

FIG.11

PROGRAM ANALYZER AND CONTROL SYSTEM

RELATED APPLICATIONS

The present application is a National Phase of International Application Number PCT/JP2021/010639, filed Mar. 16, 2021, and claims priority based on Japanese Patent Application No. 2020-047476, filed Mar. 18, 2020.

TECHNICAL FIELD

The present invention relates to a program analyzer and a control system, and more particularly to a program analyzer and a control system operable to determine the consistency of commands in a machining program based on tool-related information.

BACKGROUND ART

A controller that controls a machine tool controls the operation of the axes of the machine tool according to a machining program. An operator creates a machining program using a machining program editor function or the like while checking the machine tool, workpieces that are the machining target, and tools used to machine the workpieces (e.g., PTL 1).

Figure 10:
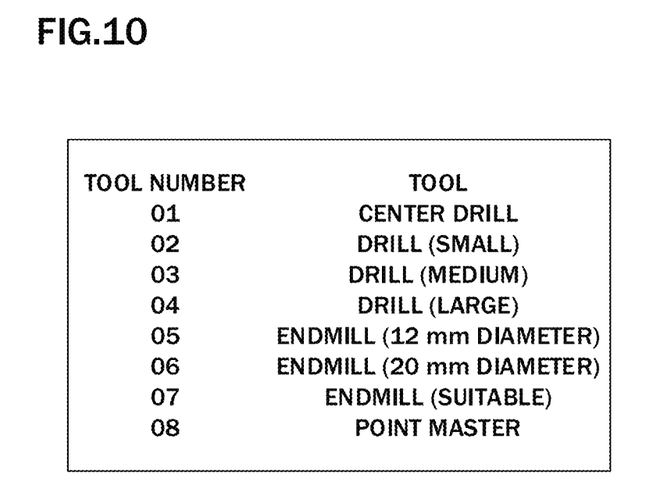
FIG. 10 is a diagram illustrating an example of correspondence between tool numbers and tools.

Tool numbers of tools to be used are specified by T codes in a machining program. FIG. 10 is a diagram illustrating an example of correspondence between tool numbers and tools. For example, when "T02" is specified in a machining program, the drill (small) corresponding to the tool number 02 is selected when this code is executed. The operator creates the machining program while referring to a table of tool numbers such as the one illustrated in FIG. 10.

CITATION LIST

Patent Literature

[PTL 1] Japanese Patent Application Publication No. 2017-111516

SUMMARY OF INVENTION

Technical Problem

When creating a machining program while checking tool numbers in a table as described above, the operator checks the codes by looking up a table of tool numbers and writes in the codes in the machining program. It is possible that a mistake or an instance of overlooking during the check leads to a selection of a wrong tool. An inconsistency in the commands of the machining program resulting from an incorrect selection of a tool or other factors may lead to a problem such as breakage of a tool or workpiece caused by a collision between the tool and the workpiece during machining.

Figure 11:
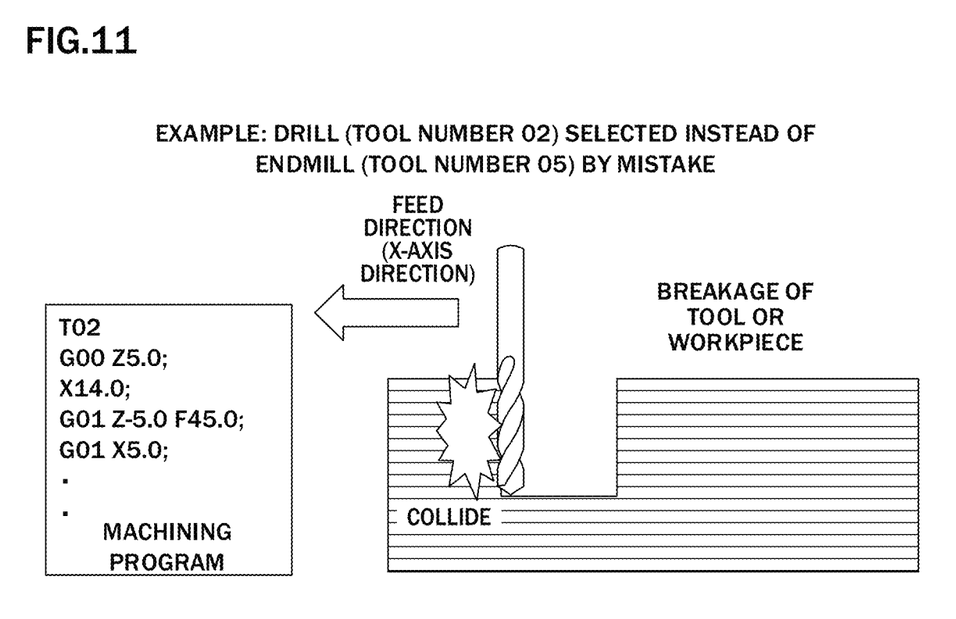
FIG. 11 is a diagram illustrating an example in which an inconsistency in a program led to a collision between a tool and a workpiece.

FIG. 11 is a diagram illustrating an example of a case where the selection of a tool in a machining program was wrong. FIG. 11 shows an example where the operator was supposed to select an endmill (tool number 05). However, a drill (tool number 02) is selected by mistake. An endmill usually has cutting edges at the tip and in the side face so that a workpiece can be machined by moving the tool laterally. The workpiece can be machined also by moving the tool vertically. On the other hand, a drill usually has a cutting edge only at the tip. Therefore, the tool can machine the workpiece when moved vertically, but cannot machine the workpiece when moved laterally. Thus the case where a drill is selected instead of an endmill by mistake and used as an endmill would entail a risk of breakage of the tool or the workpiece. If the drill is fed laterally in accordance with a cutting feed command such as "G01 X5.0;" in FIG. 11 to machine the workpiece, for example, a portion of the drill without the cutting edge may come into contact with the workpiece, which may result in breakage of the tool or the workpiece.

To avoid such a mistake, the operator must check the consistency of the machining program when creating one by consulting a table of tool numbers and comparing it sequentially with the machining program. This is a burdensome task for the operator. An alternative would be to repeat trial operation and to check the consistency between tool selection and the machining operation that uses the selected tool when creating a machining program. However, trial operation is a time-consuming task and there is a demand for minimizing this task.

Accordingly, there is a demand for a technique that enables easy validation of consistency of analyzable machining-related commands of a machining program.

Solution to Problem

The above problem is solved by a program analyzer and a control system according to one aspect of the present invention wherein, after a tool is selected, the consistency in types of commands to be executed with the tool being selected, feed directions, and tool orientations is determined based on machining information including information on the tool such as tool characteristics.

An aspect of the present invention is a program analyzer that determines if a machining program is consistent based on tool information, including: a program analysis unit that analyzes a machining program and extracts a command selecting a tool; a tool information acquisition unit that acquires tool-related information corresponding to the selected tool; and a machining command check unit that determines if commands in the machining program to be executed with the tool being selected are consistent based on the tool-related information acquired by the tool information acquisition unit.

Another aspect of the present invention is a control system that determines if a machining program is consistent based on tool information, including: a program analysis unit that analyzes a machining program and extracts a command for selecting a tool; a tool information acquisition unit that acquires tool-related information corresponding to the selected tool; and a machining command check unit that determines if commands in the machining program to be executed with the tool being selected are consistent based on the tool-related information acquired by the tool information acquisition unit.

Advantageous Effects of Invention

According to one aspect of the present invention, the consistency of commands in a machining program are determined in accordance with a selected tool so that breakage of a tool or workpiece that may be caused by a program error such as a wrong feed direction can be prevented.

DESCRIPTION OF EMBODIMENTS

Embodiments of the present invention will be hereinafter described with reference to the drawings.

Figure 1:
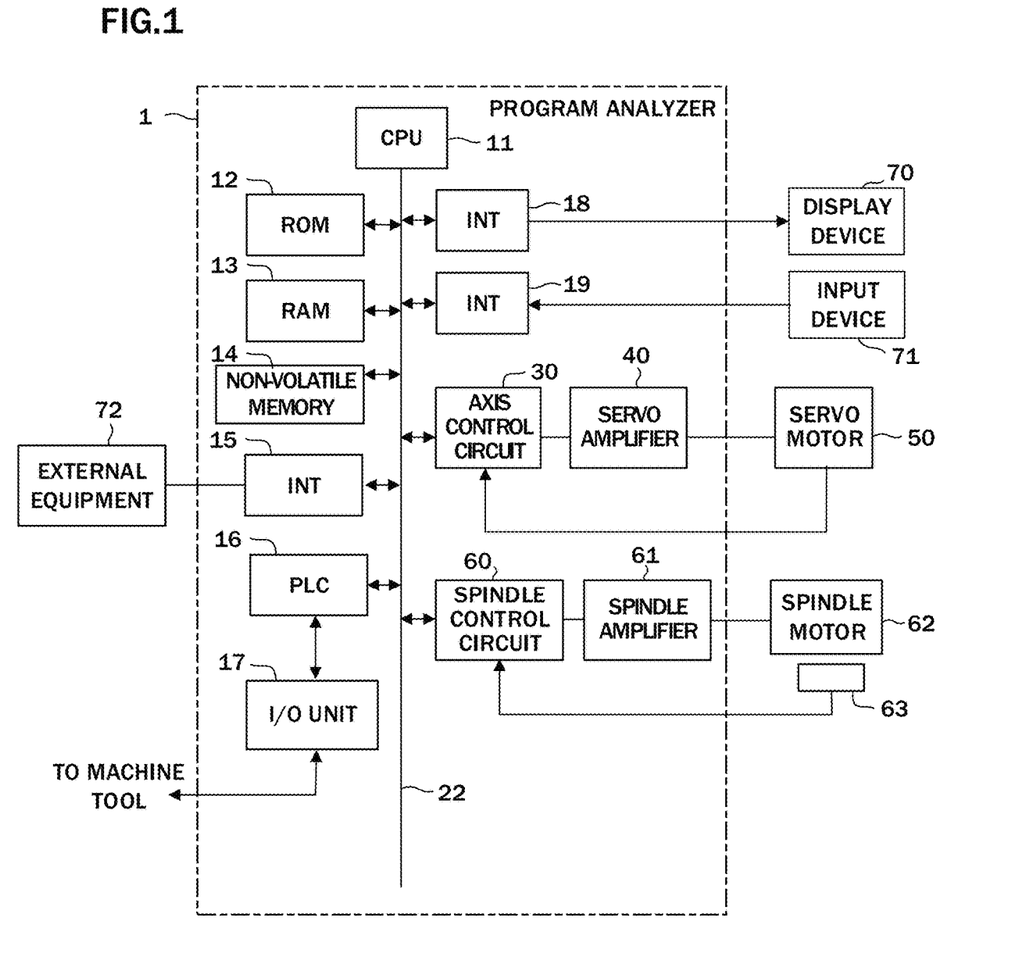
FIG. 1 is a schematic hardware configuration diagram of a program analyzer according to a first embodiment.

FIG. 1 is a schematic hardware configuration diagram illustrating a program analyzer according to a first embodiment of the present invention. The program analyzer 1 of the present invention may be implemented, for example, to a controller that controls an industrial machine that performs machining such as, for example, a machine tool. The program analyzer 1 of this embodiment may be implemented also in a personal computer, fog computer, cloud server, etc., connected via a wired or wireless network to the controller that controls a machine tool, for example.

This embodiment shows one example in which the program analyzer 1 is implemented in a controller that controls a machine tool.

The program analyzer 1 of this embodiment includes a CPU 11, which is a processor that performs overall control of the program analyzer 1. The CPU 11 reads out a system program stored in a ROM 12 via a bus 22. The CPU 11 controls the entire program analyzer 1 in accordance with the system program. A RAM 13 temporarily stores transient calculation data, display data, and various types of data input from outside.

A non-volatile memory 14 includes a memory backed up by a battery (not shown), and an SSD (Solid State Drive) or the like, for example. The non-volatile memory 14 retains stored data even when the program analyzer 1 is turned off. The non-volatile memory 14 also stores the data and machining programs read via an interface 15 from external equipment 72. The non-volatile memory 14 also stores the data and machining programs input from an input device 71 and the data and the like acquired from the machine tool. The data and machining programs stored in the non-volatile memory 14 may be loaded in the RAM 13 when executed or used. Various system programs such as known analysis programs are written in the ROM 12 beforehand.

The interface 15 is an interface for connecting the CPU 11 of the program analyzer 1 with external equipment 72 such as USB devices. Machining programs or various parameters, for example, to be used for the control of the machine tool, can be read from external equipment 72. Machining programs edited in the program analyzer 1 or various parameters can be stored in an external storage means via the external equipment 72. A PLC (Programmable Logic Controller) 16 controls the machine tool and peripheral devices of the machine tool (such as, for example, a tool exchanger, actuators of a robot or the like, sensors attached to the machine tool, etc.) by outputting signals via an I/O unit 17 in accordance with a sequence program stored in the program analyzer 1. The PLC 16 receives signals from various switches on a control panel equipped in a main body of the industrial machine or from peripheral devices, performs necessary signal processing, and transmits the signals to the CPU 11.

A display device 70 displays the data read into the memory, and the data acquired as the results of execution of a machining program or a system program, output via an interface 18. An input device 71, which is composed of a keyboard, a pointing device, and so on, transmits instructions based on operations by an operator, data and so on, to the CPU 11 via an interface 19.

An axis control circuit 30 for controlling an axis of the machine tool receives axis motion commands from the CPU 11 and outputs the commands to a servo amplifier 40. The servo amplifier 40 drives a servo motor 50 for the movement of the axis of the machine tool based on the received commands. The servo motor 50 for the axis has a built-in position/speed detector. The servo motor 50 feeds back position/speed feedback signals from the position/speed detector to the axis control circuit 30, and the axis control circuit 30 performs feedback control of position/speed.

While the hardware configuration diagram of FIG. 1 illustrates only one each axis control circuit 30, servo amplifier 40, and servo motor 50, the machine tool that is the control target in actual practice is provided with the same number of these components as that of the axes equipped to the machine tool. For example, when controlling a common machine tool, three sets of axis control circuits 30, servo amplifiers 40, and servo motors 50 are provided for the movement of a spindle carrying a tool attached thereto and a workpiece relative to each other in directions along the three axes (X axis, Y axis, and Z axis) perpendicular to one another.

A spindle control circuit 60 outputs a spindle speed signal to a spindle amplifier 61 in response to a spindle rotation command. The spindle amplifier 61 that received this spindle speed signal rotates a spindle motor 62 of the machine tool at an instructed rpm to drive the tool. A position coder 63 is coupled to the spindle motor 62. The position coder 63 outputs a feedback pulse in synchronization with the rotation of the spindle. This feedback pulse is read by the CPU 11.

Figure 2:
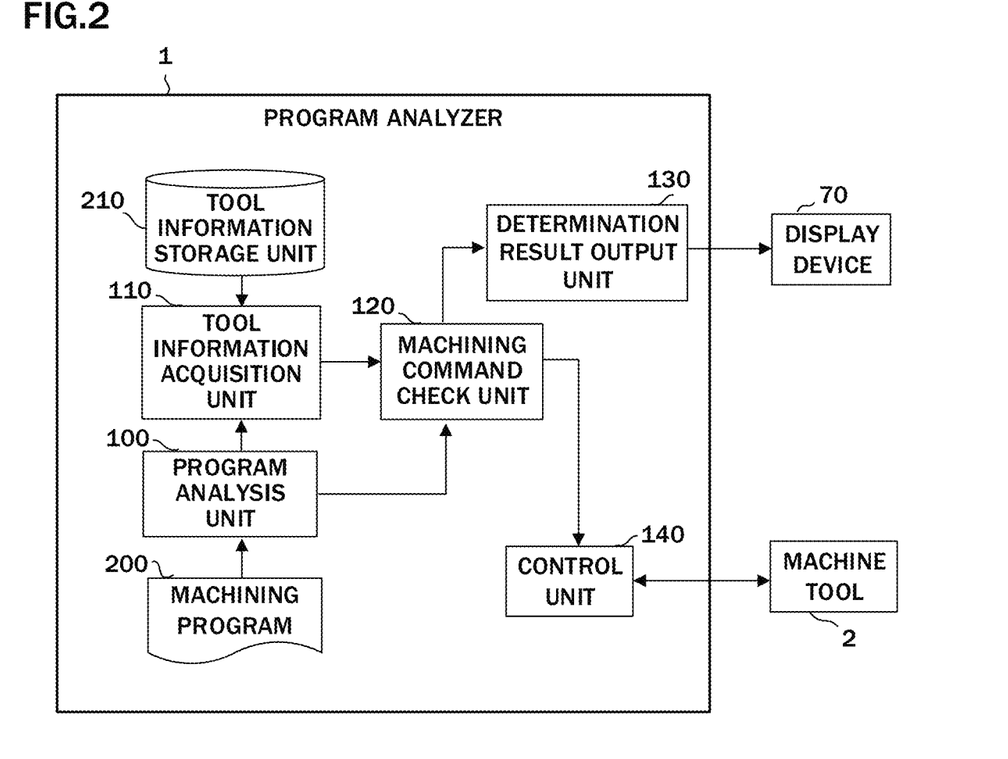
FIG. 2 is a schematic functional block diagram of the program analyzer according to the first embodiment.

FIG. 2 is a schematic block diagram illustrating the functions of the program analyzer 1 according to the first embodiment of the present invention. Various functions of the program analyzer 1 of this embodiment are realized by the CPU 11 of the program analyzer 1 illustrated in FIG. 1 executing a system program and controlling the operation of each part of the program analyzer 1.

The program analyzer 1 of this embodiment includes a program analysis unit 100, a tool information acquisition unit 110, a machining command check unit 120, a determination result output unit 130, and a control unit 140. A machining program 200 acquired from the input device 71 or external equipment 72 is stored beforehand in the RAM 13 or non-volatile memory 14 of the program analyzer 1. A tool information storage unit 210, which is an area where information relating to tools is stored beforehand, is prepared in advance in the RAM 13 or non-volatile memory 14 of the program analyzer 1.

The program analysis unit 100 is realized by the CPU 11 executing the system program read out from the ROM 12 and primarily performing arithmetic computation using the RAM 13 and non-volatile memory 14. The program analysis unit 100 prefetches and analyzes blocks of operation commands for the machine tool 2 from the machining program 200. The program analysis unit 100 generates command data for instructing the operation of servo motors 50 and spindle motors 62 of the machine tool 2 based on the analysis results. The program analysis unit 100 outputs the generated command data to the machining command check unit 120. The program analysis unit 100 also extracts a tool selection command (T code) from the prefetched command data and outputs a tool number of a tool selected by the tool selection command to the tool information acquisition unit 110.

The tool information acquisition unit 110 is realized by the CPU 11 executing the system program read out from the ROM 12 and primarily performing arithmetic computation using the RAM 13 and non-volatile memory 14. The tool information acquisition unit 110 acquires information relating to the tool selected by the tool selection command that is extracted by the program analysis unit 100. The tool information acquisition unit 110 may acquire tool-related information corresponding to a tool number from the tool information storage unit 210 based on the tool number input from the program analysis unit 100. The tool-related information acquired by the tool information acquisition unit 110 includes information on the commands during the machining using the tool such as, for example, commands that are executable with the tool being selected, commands that are not executable with the tool being selected, possible feed directions for the cutting with the tool, impossible feed directions for the cutting with the tool, tool compensation that can be applied to the tool, tool compensation that cannot be applied to the tool, postures of the attached tool, and so on.

Figure 3:
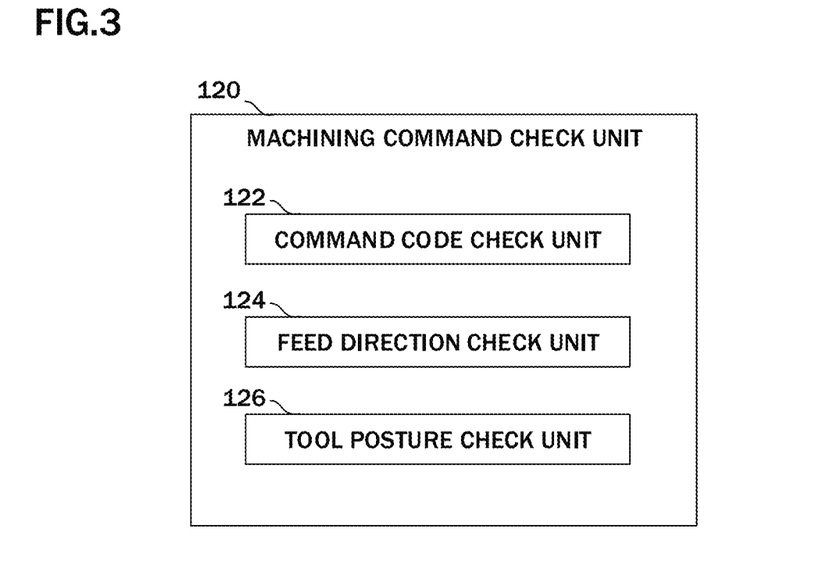
FIG. 3 is a schematic diagram illustrating the functions of a machining command check unit.

The machining command check unit 120 is realized by the CPU 11 executing the system program read out from the ROM 12 and primarily performing arithmetic computation using the RAM 13 and non-volatile memory 14. The machining command check unit 120 determines the consistency of commands in the machining program 200 analyzed by the program analysis unit 100 based on the tool-related information acquired by the tool information acquisition unit 110. The machining command check unit 120 extracts commands to be executed with a tool being selected by a tool selection command, from the commands in the machining program 200. The machining command check unit 120 determines the consistency of the extracted commands based on the information related to the selected tool. The machining command check unit 120 includes at least any of a command code check unit 122, a feed direction check unit 124, and a tool posture check unit 126, as illustrated in FIG. 3.

The command code check unit 122 determines the consistency of commands in the machining program 200 based on the information relating to command codes included in the tool-related information acquired by the tool information acquisition unit 110. When the tool-related information acquired by the tool information acquisition unit 110 includes, for example, information on a command that is executable with the tool being selected (hereinafter, "executable command information"), and at the same time, the commands in the machining program 200 that are to be executed with the tool in question being selected by the tool selection command include a command that does not belong to the executable command information, the command code check unit 122 determines that this command is an inconsistent command. When the tool-related information acquired by the tool information acquisition unit 110 includes, for example, information relating to a command that must not be executed with the tool being selected (hereinafter, "inexecutable command information"), and at the same time, the commands in the machining program 200 that are to be executed with the tool in question being selected by the tool selection command include a command that belongs to the inexecutable command information, the command code check unit 122 determines that this command is an inconsistent command.

The feed direction check unit 124 determines the consistency in the feed directions specified by the commands in the machining program 200 based on the information relating to feed directions included in the tool-related information acquired by the tool information acquisition unit 110. When the tool-related information acquired by the tool information acquisition unit 110 includes, for example, information relating to a feed direction in which cutting with the tool is possible (hereinafter, "possible cutting feed direction information"), and at the same time, the commands in the machining program 200 that are to be executed with the tool in question being selected by the tool selection command include a command for a cutting feed in a direction not included in the possible cutting feed direction information, the feed direction check unit 124 determines that this command is an inconsistent command. When the tool-related information acquired by the tool information acquisition unit 110 includes, for example, information relating to a feed direction in which cutting with the tool is not possible (hereinafter, "impossible cutting feed direction information"), and at the same time, the commands in the machining program 200 that are to be executed with the tool in question being selected by the tool selection command include a command for a cutting feed in a direction included in the impossible cutting feed direction information, the feed direction check unit 124 determines that this command is an inconsistent command.

The tool posture check unit 126 determines the consistency between a tool posture specified by a command in the machining program 200 and a specification of a coordinate system by the machining program 200 based on the information relating to the postures of the attached tool included in the tool-related information acquired by the tool information acquisition unit 110. When the information relating to the postures of the attached tool acquired by the tool information acquisition unit 110 includes, for example, a maximum tilt angle of the tool (hereinafter, "maximum tool tilt angle"), and at the same time, the commands that are to be executed with the tool in question being selected by the tool selection command include a command that changes the tool posture so that the tool inclination will exceed the maximum tool tilt angle, the tool posture check unit 126 determines that this command is an inconsistent command. When, for example, the commands in the machining program 200 that are to be executed with the tool in question being selected by the tool selection command do not include both of a command that changes the tool posture, e.g., a command that drives a rotation axis B to tilt the tool posture, and a command that changes the feature coordinate system in accordance with the changed tool posture, the tool posture check unit 126 determines that these commands are inconsistent commands.

If, as a result of consistency determination, there are commands in the machining program 200 that are determined to be inconsistent, the machining command check unit 120 outputs a signal to the determination result output unit 130 to display the result. The machining command check unit 120 in this embodiment outputs command data of consistent commands to the control unit 140. If, on the other hand, the commands are determined to include inconsistent commands, the machining command check unit 120 instructs the control unit 140 to interrupt the execution of control operations relating to the machining by the machine tool 2.

The determination result output unit 130 is realized by the CPU 11 executing the system program read out from the ROM 12 and primarily performing arithmetic computation using the RAM 13 and non-volatile memory 14, and input/output processing using the interfaces 18 and 19. The determination result output unit 130 outputs the results of determination of the consistency of commands in the machining program 200 determined by the machining command check unit 120 to be displayed in the display device 70. The determination result output unit 130 may also output information of the tool that is being selected when the command determined to be inconsistent is to be executed, together with the result of consistency determination. The determination result output unit 130 may output the results of determination of the consistency determined by the machining command check unit 120 to the non-volatile memory 14 as logs. Optionally, the determination result output unit 130 may output the results of determination of the consistency determined by the machining command check unit 120 to a management device such as a host computer via a network (not shown).

The control unit 140 is realized by the CPU 11 executing the system program read out from the ROM 12 and primarily performing arithmetic computation using the RAM 13 and non-volatile memory 14, and performing the processing for the control of various parts of the machine tool 2 using the axis control circuit 30, spindle control circuit 60, and PLC 16. The control unit 140 controls various parts of the machine tool 2 based on the command data analyzed by the program analysis unit 100. For example, the control unit 140 generates data regarding the movement of axes based on commands for moving the axes of the machine tool 2 and outputs the data to the servo motors 50. The control unit 140 also generates data regarding rotation of the spindle, for example, based on a command for rotating the spindle of the machine tool 2 and outputs the data to the spindle motor 62. Moreover, the control unit 140 generates predetermined signals for operating peripheral devices, for example, based on commands for operating these peripheral devices of the machine tool 2 and outputs the signals to the PLC 16. Meanwhile, the control unit 140 acquires feedback values (motor current values, positions, speeds, accelerations, torques, and so on) that represent the conditions of the servo motors 50 and spindle motors 62 and use the feedback values in various steps of the control processing.

Operation examples of the program analyzer configured as described above will be described with reference to FIG. 4 and FIG. 5.

Figure 4:
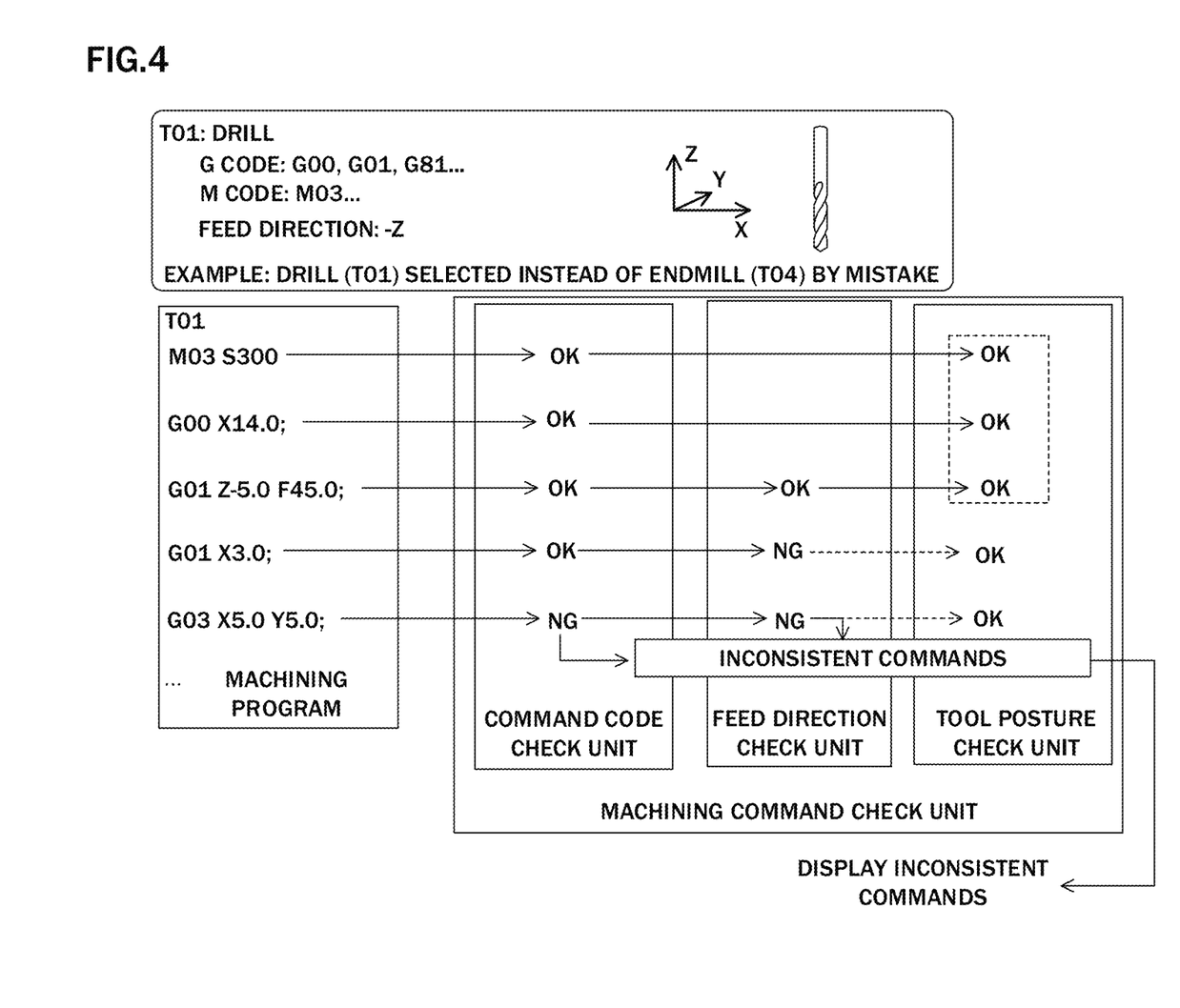
FIG. 4 is a diagram illustrating an example of determining the consistency of a machining program.

FIG. 4 illustrates an example of operation of the program analyzer 1 in a case where an endmill (tool number 04) was supposed to be used but a drill (tool number 01) was selected instead due to an incorrect tool selection command in the machining program. The tool information storage unit 210 stores therein tool information relating to drills beforehand, including G codes such as G00, G01, G81, and M codes such as M03, that are executable command information, and the negative Z-axis direction (−Z) as a possible cutting feed direction. The operator meant to write a program to perform machining using an endmill, but created a machining program in which T01 (drill) was incorrectly selected by a tool selection command as illustrated on the left side in FIG. 4.

The program analyzer 1 according to this embodiment instructed to execute such a machining program consecutively prefetches the machining program. The tool information acquisition unit 110 determines that the drill (tool number 01) has been selected by the command T01, and acquires the information related to the drill from the tool information storage unit 210. The machining command check unit 120 then determines the consistency of commands in the machining program based on the acquired tool-related information.

The command code check unit 122 determines that the commands M03, G00, and G01 are consistent commands since these commands are included in the executable command information of the tool-related information. On the other hand, the command code check unit 122 determines that the command G03 is an inconsistent command since this command is not included in the executable command information of the tool-related information.

The feed direction check unit 124 determines any of cutting feed commands (commands G01 and G03 in the example of FIG. 4) specifying a feed direction that matches the possible cutting feed direction, which is the negative Z-axis direction (G01 Z-5.0 F45.0;), as a consistent command. On the other hand, the feed direction check unit 124 determines any commands specifying a feed direction that does not match the possible cutting feed direction, which is the negative Z-axis direction (G01 X3.0; and G03 X5.0 Y5.0;), as inconsistent commands.

The tool posture check unit 126 determines the consistency in terms of the tool posture of the drill. In the example of FIG. 4, there are no command relating to a change in the tool posture or command for a change of the coordinate system, and therefore, the tool posture check unit 126 determines that all the commands are consistent.

When there are commands that are determined to be inconsistent in one of the criteria (G01 X3.0; and G03 X5.0 Y5.0;), the determination result output unit 130 outputs the determination result together with the information of the selected tool (drill) to be displayed on the display device 70. The operator who looks at this display can revise the commands deemed to be inconsistent and the selected tool. For example, having looked at this display, the operator can correct the machining program by altering the tool selection command to select the endmill (tool number T04) that is the correct tool.

Figure 5:
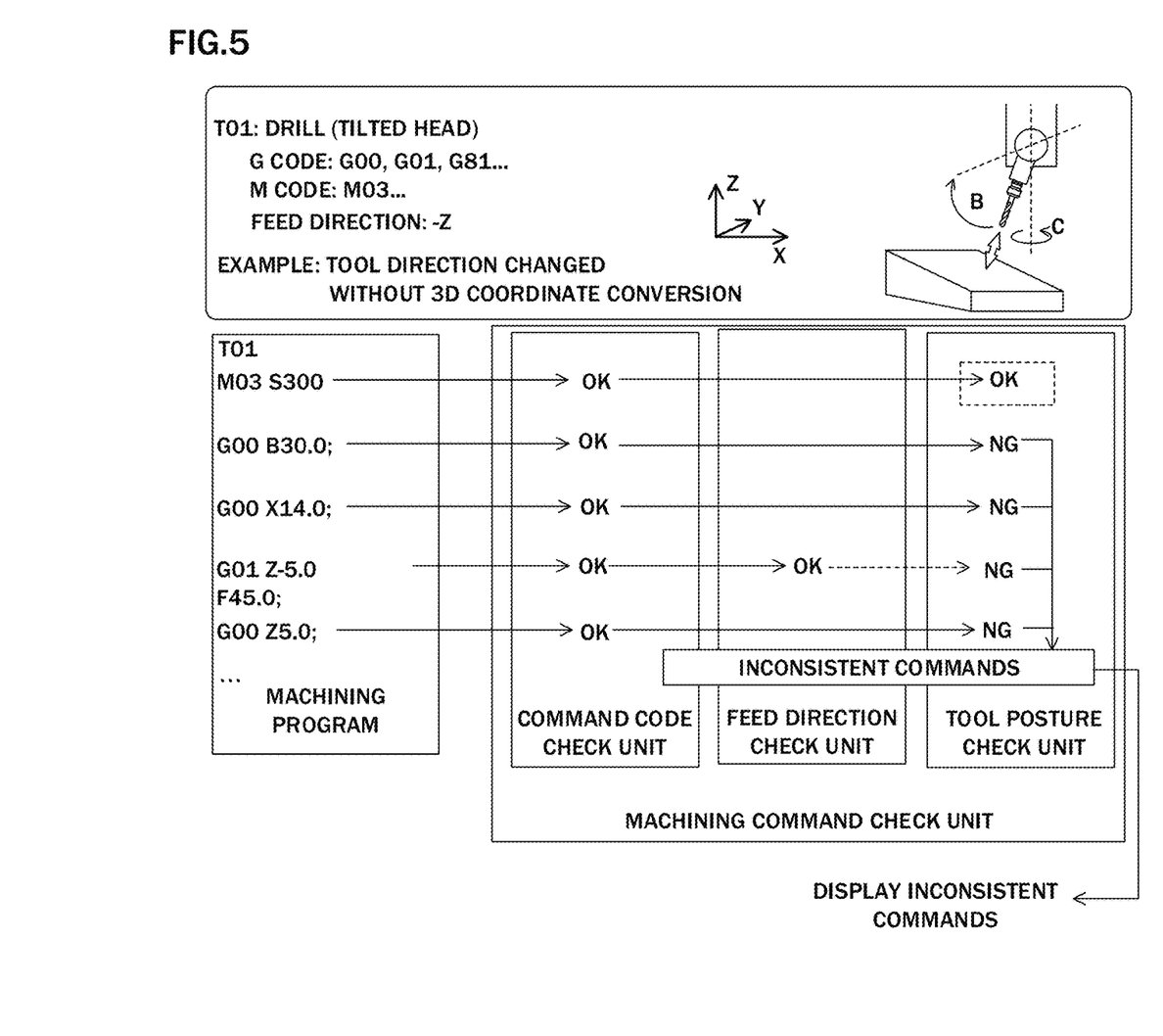
FIG. 5 is a diagram illustrating another example of determining the consistency of a machining program.

FIG. 5 illustrates an example of operation of the program analyzer 1 in a case where the machining program omitted 3D coordinate conversion when drilling a hole in a slope of a workpiece using a drill (tool number 01) in a tilted head. The tool information storage unit 210 stores therein the tool information relating to the drill beforehand, including G codes such as G00, G01, G81, and M codes such as M03, which are executable command information, and the negative Z-axis direction (−Z) as a possible cutting feed direction.

The program analyzer 1 according to this embodiment instructed to execute such a machining program consecutively prefetches the machining program. The tool information acquisition unit 110 determines that the drill (tool number 01) has been selected by the command T01, and acquires the information related to the drill from the tool information storage unit 210. The machining command check unit 120 then determines the consistency of commands in the machining program based on the acquired tool-related information.

The command code check unit 122 determines that the commands M03, G00, and G01 are consistent commands since these commands are included in the executable command information of the tool-related information.

The feed direction check unit 124 determines the cutting feed command (command G01 in the example of FIG. 5) specifying a feed direction that matches the possible cutting feed direction, which is the negative Z-axis direction (G01 Z-5.0 F45.0;), as a consistent command.

Meanwhile, the tool posture check unit 126 determines the consistency in terms of the tool posture of the drill in the tilted head. In the example of FIG. 5, a command relating to a change in the tool posture (G00 B30.0;) is executed. However, no 3D coordinate conversion command in accordance with this command is executed. Therefore, the tool posture check unit 126 determines that the command relating to the change in the tool posture and any feed commands from then on as being inconsistent commands.

When there are commands that are determined to be inconsistent in one of the criteria, the determination result output unit 130 outputs the determination result together with the information of the selected tool (drill in the tilted head) to be displayed on the display device 70. The operator who looks at this display can revise the commands deemed to be inconsistent and the selected tool. For example, having looked at this display, the operator can correct the machining program by adding "G68 X0. Y0. Z0. I0. J1. K0. R30.;", which is a 3D coordinate conversion command, after "G00 B30.0;".

The program analyzer 1 according to this embodiment configured as described above can thus determine the consistency of commands corresponding to a selected tool in a machining program. This allows the operator to revise the machining program without a heavy burden. Therefore, breakage of tools and workpieces caused by a wrong selection of a tool or erroneous machining-related commands or feed directions in a program can be prevented proactively.

Figure 6:
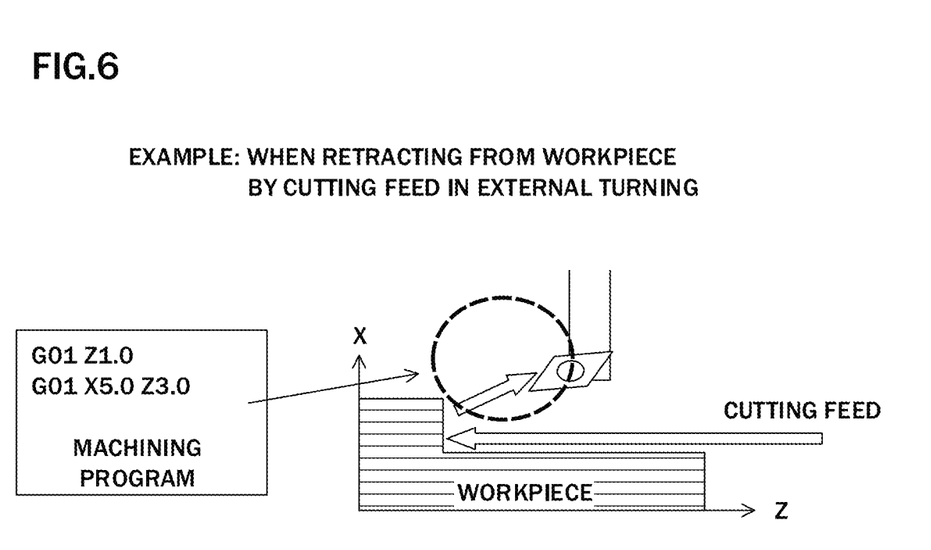
FIG. 6 is a diagram illustrating an example of consistency determination using workpiece information.

In one variation example of the program analyzer 1 according to this embodiment, the program analyzer 1 may utilize information of a workpiece that is the machining target in determining the consistency of commands in the machining program. Controllers process a G00 command as a rapid traverse command and a G01 command as a cutting feed command. In creating a machining program, in general, the G00 command is used for the paths in which the workpiece is not machined, and the G01 command is used for the paths in which the workpiece is machined. In some cases, however, the G01 command may be used in the paths in which the workpiece is not machined. Therefore, the machining command check unit 120 may acquire workpiece information including the information such as the size and shape of the workpiece, and treat any cutting feed commands to be executed at a position where the tool does not contact the workpiece as not being cutting feed commands. This configuration allows the feed direction check unit 124, for example, of the machining command check unit 120 to determine any cutting feed commands that do not involve a contact between the tool and the workpiece as being consistent. In a case where a cutting tool during outer surface turning of a workpiece is retracted from the workpiece by a G01 command (cutting feed command) as illustrated in FIG. 6, the cutting feed command is executed in a direction that is not included in the information of feed directions in which machining is possible. Even in such a case, the feed direction check unit 124 determines "G01 X5.0 Z30.;" in FIG. 6 as being a consistent command in consideration of the workpiece information. This enables more flexible determination of consistency with regard to cutting feed commands.

Figure 7:
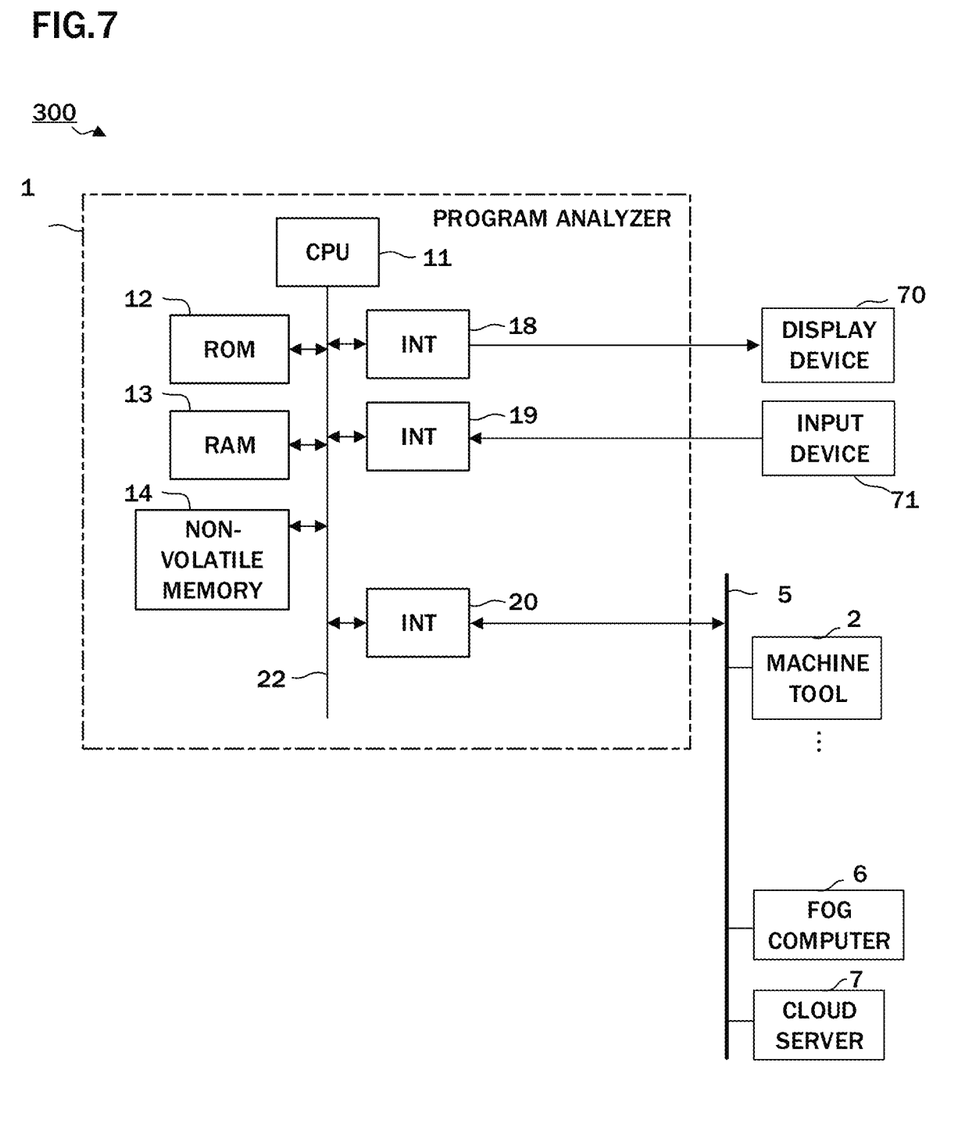
FIG. 7 is a schematic hardware configuration diagram of a program analyzer according to a second embodiment.

FIG. 7 is a schematic hardware configuration diagram illustrating a program analyzer according to a second embodiment of the present invention. This embodiment shows one example in which the program analyzer 1 is implemented in a computer connected to a machine tool (controller that controls the machine tool) via a network.

The program analyzer 1 of this embodiment configures a control system 300 connected to the machine tool (controller that controls the machine tool) via a network.

The program analyzer 1 of this embodiment includes, similarly to the program analyzer 1 of the first embodiment, a CPU 11, a ROM 12, a RAM 13, and a non-volatile memory 14, and performs input/output processing for communication with a display device 70 and an input device 71 via interfaces 18 and 19, respectively.

The interface 20 is an interface for connecting the CPU 11 of the program analyzer 1 according to this embodiment with a wired or wireless network 5. A machine tool 2, a fog computer 6, a cloud server 7, etc. are connected to the network 5, and these devices and the program analyzer 1 exchange data with one another.

Figure 8:
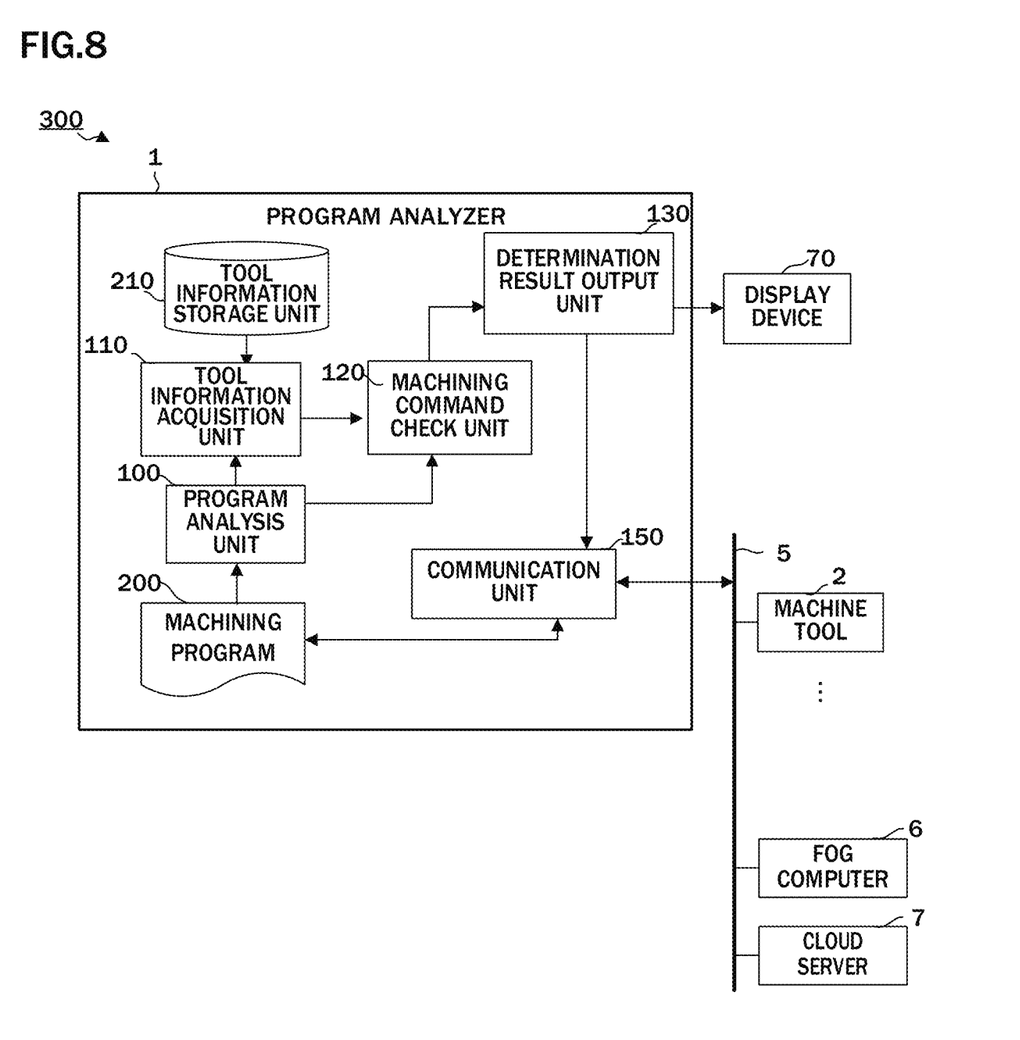
FIG. 8 is a schematic functional block diagram of the program analyzer according to the second embodiment.

FIG. 8 is a schematic block diagram illustrating the functions of the program analyzer 1 according to the second embodiment of the present invention. Various functions of the program analyzer 1 of this embodiment are realized by the CPU 11 of the program analyzer 1 illustrated in FIG. 1 executing a system program to control the operation of various parts of the program analyzer 1.

The program analyzer 1 of this embodiment includes a program analysis unit 100, a tool information acquisition unit 110, a machining command check unit 120, a determination result output unit 130, and a communication unit 150. A machining program 200 acquired from the input device 71 or external equipment 72 is stored beforehand in the RAM 13 or non-volatile memory 14 of the program analyzer 1. A tool information storage unit 210, which is an area where tool-related information is stored beforehand, is prepared in advance in the RAM 13 or non-volatile memory 14 of the program analyzer 1.

The program analysis unit 100, tool information acquisition unit 110, machining command check unit 120, and determination result output unit 130 of the program analyzer 1 of this embodiment have similar functions as the respective units of the program analyzer 1 according to the first embodiment.

The communication unit 150 is realized by the CPU 11 executing a system program read out from the ROM 12 and primarily performing arithmetic computation using the RAM 13 and non-volatile memory 14, and input/output processing using the interface 20. The communication unit 150 sends and receives machining programs 200 or results of consistency determination of machining programs 200 to and from the machine tool 2, fog computer 6, cloud server 7, or a program generating machine, a simulator, or a CAD/CAM system that are not shown. If some of the commands in the machining program 200 are determined to lack consistency, the machining command check unit 120 may send an instruction to the machine tool 2 from the communication unit 150 via the network to interrupt the execution of the machining operation.

The program analyzer 1 according to this embodiment configured as described above may receive a machining program to be executed in the machine tool 2, a machining program stored in the fog computer 6 or cloud server 7, or a machining program created by a program generating machine, a simulator, or a CAD/CAM system that are not shown, determine the consistency of the commands of the received machining program, and send back the determination results. Accordingly, the consistency of the machining program can be determined before the machining program is actually executed by a controller, and the program can be corrected.

While embodiments of the present invention have been described above, the present invention is not limited to the examples of the embodiments described above and may be carried out in various ways by adding suitable changes.

Figure 9:
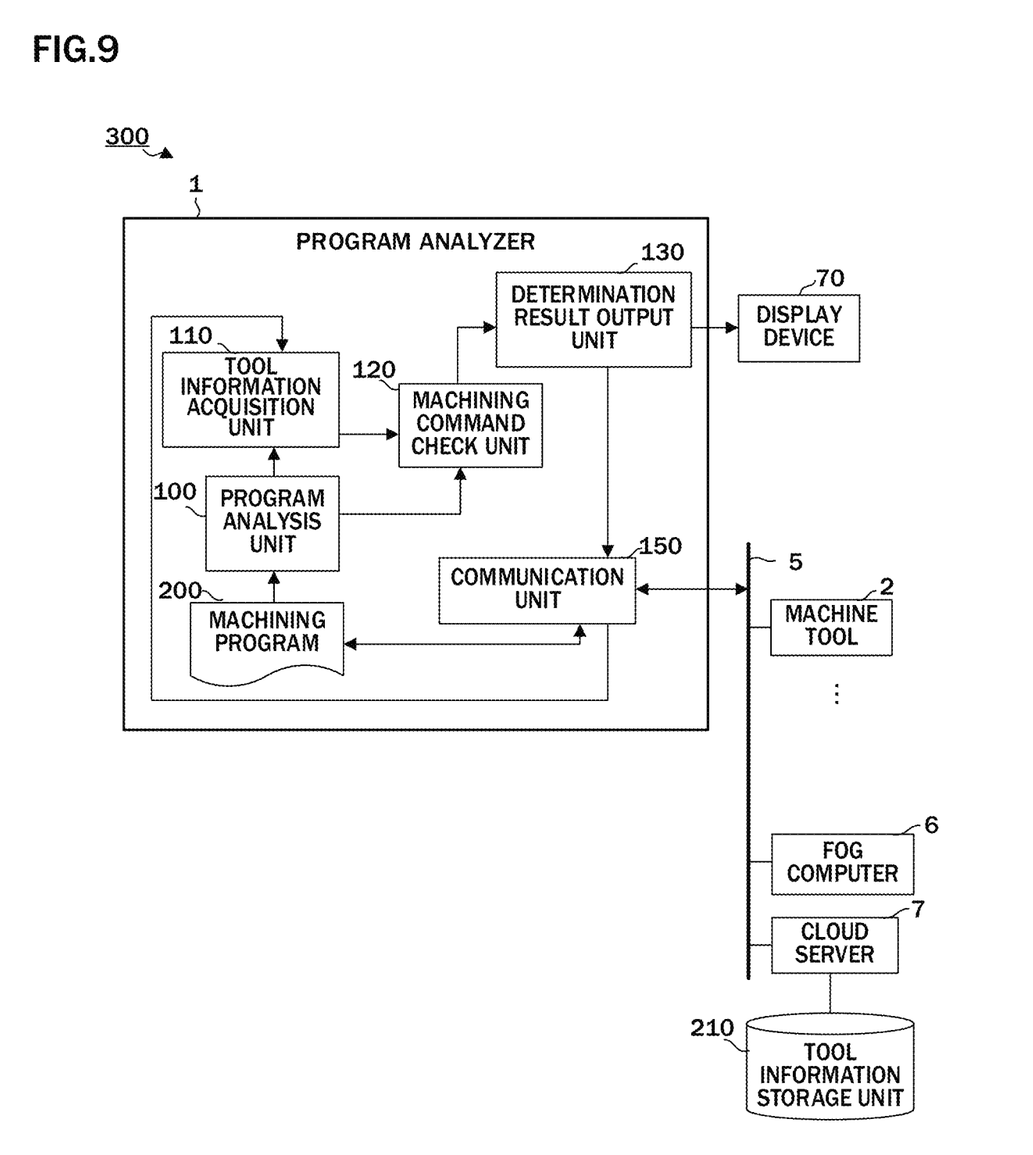
FIG. 9 is a schematic functional block diagram of the program analyzer according to a variation example.

For example, the program analyzers 1 in the first and second embodiments described above include a tool information storage unit 210 in an internal memory. Instead, the tool information storage unit 210 may be provided in an external host computer, a fog computer, a cloud server or the like, and configured to acquire tool information via a network. As illustrated in FIG. 9, for example, the tool information storage unit 210 may be provided in a cloud server 7 so that a plurality of program analyzers 1 can share the tool information. This allows centralized and collective maintenance of the tool information shared by a plurality of factories.

The invention claimed is:

1. A controller for controlling an industrial machine configured to perform machining, the controller configured for determining whether a machining program is consistent based on tool information, the controller comprising:
   a program analysis unit configured to
      analyze the machining program, and
      extract a command for selecting a tool;
   a tool information acquisition unit configured to acquire tool-related information corresponding to the selected tool;
   a machining command check unit configured to determine whether commands in the machining program to be executed with the tool being selected are consistent based on information relating to a posture of the tool contained in the tool-related information acquired by the tool information acquisition unit; and
   a control unit configured to control the industrial machine configured to perform machining based on the machining program, wherein
   the machining command check unit includes a tool posture check unit configured to determine a consistency between an actual orientation of the selected tool and a specification of a coordinate system by the machining program; and
   the control unit is configured to, in response to the machining command check unit determining that there is an inconsistency, interrupt operations of controlling the machining by the industrial machine.

2. The controller according to claim 1, further comprising:
   a tool information storage unit that stores tool numbers and information related to tools corresponding to the tool numbers in association with each other, wherein
   the tool information acquisition unit is configured to acquire information relating to the selected tool from the tool information storage unit based on a tool number specified by a tool selection command extracted by the program analysis unit.

3. The controller according to claim 1, wherein
   the machining command check unit further includes a command code check unit configured to determine whether the commands in the machining program are consistent based on information related to a command code indicated in information relating to the selected tool.

4. The controller according to claim 1, wherein
   the machining command check unit further includes a feed direction check unit configured to determine whether feed directions specified by the commands in the machining program are consistent based on information related to a feed direction indicated in information relating to the selected tool.

5. The controller according to claim 3, wherein
   the machining command check unit is configured to
      acquire workpiece information of a workpiece to be machined by the machining program, and
      determine whether feed commands determined to cause physical cutting of the workpiece are consistent based on the acquired workpiece information and the machining program.

6. The controller according to claim 1, further comprising:
   a display unit configured to, in response to the machining command check unit determining that there is an inconsistency, display an inconsistent portion of the machining program.

7. A control system connected to a controller for controlling an industrial machine via a network, the control system configured for determining whether a machining program is consistent based on tool information, the control system comprising:
   a program analysis unit configured to
      analyze the machining program, and
      extract a command for selecting a tool;
   a tool information acquisition unit configured to acquire tool-related information corresponding to the selected tool; and
   a machining command check unit configured to
      determine whether commands in the machining program to be executed with the tool being selected are consistent based on information relating to a posture of the tool contained in the tool-related information acquired by the tool information acquisition unit, and
      in response to determining that there is an inconsistency, instruct the controller configured to control an industrial machine performing a machining operation based on the machining program to interrupt the machining operation, wherein
   the machining command check unit includes a tool posture check unit configured to determine the consistency between an actual orientation of the selected tool and a specification of a coordinate system by the machining program.

8. The control system according to claim 7, further comprising:
   a tool information storage unit that stores tool numbers and information related to tools corresponding to the tool numbers in association with each other, wherein
   the tool information acquisition unit is configured to acquire information relating to the selected tool from the tool information storage unit based on a tool number specified by a tool selection command extracted by the program analysis unit.

* * * * *